United States Patent [19]

Barnes

[11] Patent Number: 4,632,834
[45] Date of Patent: Dec. 30, 1986

[54] PROCESS FOR PRODUCING FROZEN SWEET POTATO PRODUCTS

[75] Inventor: Carson B. Barnes, Spring Hope, N.C.

[73] Assignee: Farm Pak Products Inc., Spring Hope, N.C.

[21] Appl. No.: 451,047

[22] Filed: Dec. 20, 1982

[51] Int. Cl.$^4$ .................. A23L 1/216; A23L 1/272
[52] U.S. Cl. ............................. 426/262; 426/637
[58] Field of Search .................. 426/262, 637, 808

[56] References Cited

U.S. PATENT DOCUMENTS 2,056,884  10/1936  Brunstetter ..................... 426/637
3,007,800  11/1961  Kimbrough et al. .......... 426/637 X

OTHER PUBLICATIONS

Berolyheimer, *Encyclopedia Cookbook*, 1948, pp. 500 & 504, Gp 170.

Sturges, *Southern Country Cookbook*, 1975, p. 183, Gp 170.

Hewitt, *The N.Y. Times Heritage Cookbook*, 1972, pp. 247–248, Gp 170.

*Primary Examiner*—Arthur L. Corbin
*Attorney, Agent, or Firm*—Burns, Doane, Swecker & Mathis

[57] ABSTRACT

A frozen sweet potato product is produced wherein unpeeled sweet potatoes are sliced in a direction perpendicular to their longitudinal axes to form slices of about one-quarter inch thickness. The sweet potato slices are blanched for about 1 to 1.5 minutes in water of about 200° F. The blanched sweet potato slices are cooled to below 80° F. Orange juice is applied to the cooled sweet potato slices. The individual sweet potato slices are then quick-frozen and packaged.

10 Claims, 1 Drawing Figure

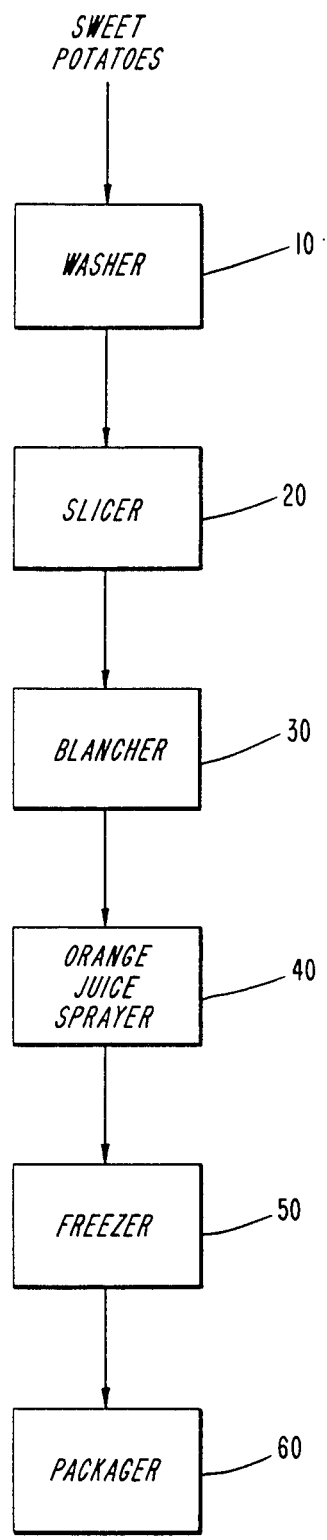

PROCESS FOR PRODUCING FROZEN SWEET POTATO PRODUCTS

BACKGROUND AND OBJECTS OF THE INVENTION

The present invention relates to a process for producing a frozen sweet potato product and, in particular, for maintaining the flavor and color of the sweet potato.

The production of frozen potato products is common, e.g., see U.S. Pat. No. 3,644,129 issued to Sloan on Feb. 22, 1972 which proposes to (i) slice the potatoes, (ii) blanche the slices, and (iii) freeze the blanched slices. Blanching may cause some lessening of flavor, especially in the case of sweet potatoes which are relatively flavorful. Blanching would also diminish (lighten) the color of the sweet potato slices.

Therefore, it would be desirable to produce a frozen sweet potato product while optimizing the resulting flavor and color, preferably without the addition of artificial flavoring and/or coloring.

SUMMARY OF THE INVENTION

These objects are achieved by the present invention which relates to a process for producing a frozen sweet potato product. The process comprises the steps of slicing sweet potatoes and blanching the sweet potato slices in hot water. Orange juice is applied to the blanched sweet potato slices prior to the slices being frozen.

Preferably, the sweet potato slices are cooled to below 80° F. after blanching and before the application of orange juice, most preferably between 65° to 75° F.

The sweet potatoes are preferably sliced in a direction perpendicular to their longitudinal axes to a thickness of about ¼ inch while in an unpeeled condition. Blanching is preferably performed for about 1 to 1.5 minutes in hot water about 200° F.

THE DRAWING

The objects and advantages of the invention will become apparent from the following detailed description of a preferred embodiment thereof, in connection with the accompanying drawing, in which like numerals designate like elements, and in which the sole FIGURE depicts schematically the series of stations to which the sweet potatoes are delivered in accordance with the present invention.

DETAILED DESCRIPTION OF A PREFERRED EMBODIMENT OF THE INVENTION

In accordance with the present invention, raw sweet potatoes are delivered to a washing station 10. The sweet potatoes are preferably about 1 to 2 inches in diameter, although other sizes can be processed according to the present invention.

The washing station 10 comprises any kind of a conventional washer which thoroughly cleans the sweet potatoes without removing the skins.

The cleaned, unpeeled sweet potatoes are then delivered to a slicer 20 which slices the sweet potatoes in a direction perpendicular to their longitudinal axes to form disc-shaped slices, preferably about ¼ inch thick. Any suitable conventional slicer can be employed, such as a Ursthel O.V. slicer. Note that the slicing of white potatoes in this manner has been heretofore proposed in U.S. Pat. No. 3,057,386 issued to Massaro on Oct. 9, 1962.

The sweet potato slices are then delivered to a blanching station 30 in which the slices are submerged in hot water, preferably at a temperature of about 200° F. The sweet potatoes reside therein for a period of from 1 to 1.5 minutes. Any suitable conventional blanching apparatus may be employed, such as a well-known Rietz blancher.

After being blanched, the sweet potato slices are allowed to cool to below 80° F., preferably to a temperature of from 65° to 70° F.

When the potatoes have reached the desired temperature, liquid orange juice is applied to the potatoes. This is accomplished preferably by means of a sprayer 40, although alternatively the sweet potatoes could be submerged within orange juice. The orange juice can be made from a concentrate and is preferably at room temperature, e.g., about 65° to 75° F. The prior cooling of the sweet potatoes below 80° F. facilitates the absorption of the orange juice.

It has been found that the orange juice flavor blends favorably with the natural flavor of the sweet potato to compensate for the loss of flavor during the blanching step. In addition, the natural acids of the orange juice function as a color preservative for the sweet potato slices.

It is not necessary to maintain a precise control over the amount of orange juice which is applied to the sweet potato slices, since the sweet potato slices exhibit only a limited capacity for absorbing the juice. Thus, there is no danger of an excessive amount of orange juice being applied.

After the orange juice has been applied, the sweet potato slices are delivered to a freezing station 50, wherein the slices are individually quick-frozen, preferably to a temperature of about −10° F. Any suitable conventional quick-freezing equipment can be employed, such as a Frigoscandia freezing apparatus wherein the sweet potato slices are floated on a blast of chilled air.

After being individually quick-frozen, the sweet potato slices are delivered to a conventional packager 60 where they are sealed in suitable containers.

The frozen sweet potato slices are cooked in a frozen condition by the end user, preferably by deep-fat frying.

It will be understood that the delivery of the sweet potatoes and slices to the various stations 10–60 is performed in any suitable manner, such as by the use of endless conveyor belts for example.

As a result of the present invention, there is provided a unique sweet potato product which is rich in flavor and color attributable to the application of orange juice to the sweet potato slices after blanching.

Although the present invention has been described in connection with a preferred embodiment thereof, it will be appreciated by those skilled in the art that additions, modifications, substitutions, and deletions, not specifically described, may be made without departing from the spirit and scope of the invention as defined in the appended claims.

What is claimed is:

1. A process for producing a frozen sweet potato product comprising the steps of:
   slicing sweet potatoes;
   blanching the sweet potato slices in hot water;
   cooling the blanched sweet potatoes to below 80° F., applying orange juice to the blanched and cooled sweet potato slices; and thereafter freezing the sweet potato slices.

2. A process according to claim 1, wherein the sweet potatoes are sliced in a direction transversely of their longitudinal axes.

3. A process according to claim 1, wherein the sweet potato slices are cooled to a temperature of from 65° to 75° F.

4. A process according to claim 1, wherein the orange juice is applied at a temperature of from 65° to 75° F.

5. A process according to claim 1, wherein the sweet potatoes are sliced to a thickness of about one-quarter inch.

6. A process according to claim 1, wherein the sweet potatoes are sliced in an unpeeled condition.

7. A process according to claim 1, wherein the sweet potato slices are blanched for about 1 to 1.5 minutes in water of about 200° F.

8. A process according to claim 1, wherein the sweet potato slices are frozen to about −10° F.

9. A process for producing a frozen sweet potato product comprising the steps of:

slicing unpeeled sweet potatoes in a direction perpendicular to their longitudinal axes to form slices of about one-quarter inch thickness;

blanching the sweet potato slices for about 1 to 1.5 minutes in water of about 200° F.;

cooling the blanched sweet potato slices to below 80° F.;

applying orange juice to the cooled sweet potato slices; and thereafter quick-freezing the individual sweet potato slices.

10. A process according to claim 9, wherein said cooling step comprises cooling the blanched sweet potatoes to between 65° to 75° F.

* * * * *